(12) United States Patent
Gagnon et al.

(10) Patent No.: US 9,680,523 B1
(45) Date of Patent: Jun. 13, 2017

(54) SYSTEM AND METHOD FOR TRANSMITTING ANCILLARY DATA

(71) Applicant: Microsemi Storage Solutions (U.S.), Inc., Aliso Viejo, CA (US)

(72) Inventors: Mathieu Gagnon, Verdun (CA); Paul Borsetti, Jr., Lebanon, NJ (US)

(73) Assignee: Microsemi Storage Solutions (U.S.), Inc., Aliso Viejo, CA (US)

( * ) Notice: Subject to any disclaimer, the term of this patent is extended or adjusted under 35 U.S.C. 154(b) by 0 days.

(21) Appl. No.: 15/002,780

(22) Filed: Jan. 21, 2016

Related U.S. Application Data

(63) Continuation of application No. 14/108,806, filed on Dec. 17, 2013, now Pat. No. 9,331,739.

(51) Int. Cl.
*H04B 1/00* (2006.01)
*H04B 1/69* (2011.01)
*H04B 15/04* (2006.01)

(52) U.S. Cl.
CPC ............... *H04B 1/69* (2013.01); *H04B 15/04* (2013.01)

(58) Field of Classification Search
CPC combination set(s) only.
See application file for complete search history.

(56) References Cited

U.S. PATENT DOCUMENTS

| 5,285,474 | A | | 2/1994 | Chow et al. |
| 5,488,627 | A | * | 1/1996 | Hardin ................... H03B 29/00 375/139 |
| 7,613,211 | B1 | | 11/2009 | Fagerlund et al. |
| 7,616,553 | B2 | * | 11/2009 | Marchok .............. H04L 5/0007 370/203 |
| 7,676,012 | B1 | * | 3/2010 | Venugopal ............ H03B 23/00 375/130 |
| 8,160,117 | B1 | | 4/2012 | Courcy |
| 8,340,152 | B2 | | 12/2012 | Jeanson et al. |
| 8,379,564 | B2 | | 2/2013 | Petite et al. |
| 2006/0013121 | A1 | * | 1/2006 | Jiang .................. H04B 7/18517 370/207 |
| 2008/0231331 | A1 | | 9/2008 | Balraj et al. |
| 2013/0329843 | A1 | * | 12/2013 | Takeuchi ............. H04L 7/0331 375/375 |

\* cited by examiner

*Primary Examiner* — Wendel Cadeau
(74) *Attorney, Agent, or Firm* — Dennis R. Haszko

(57) ABSTRACT

A method and system for encoding ancillary information at a transmitter in a high-speed communications network, the method comprising: generating an electromagnetic interference (EMI) reduction signal; receiving an ancillary data symbol; generating an EMI reduction signal variation based on the ancillary data symbol; and varying a characteristic of the EMI reduction signal based on the generated EMI reduction signal variation to encode the ancillary data symbol in the varied EMI reduction signal.

15 Claims, 18 Drawing Sheets

SYSTEM AND METHOD FOR TRANSMITTING ANCILLARY DATA

CROSS REFERENCE TO RELATED APPLICATIONS

This application is a continuation of U.S. patent application Ser. No. 14/108,806 filed on Dec. 17, 2013, which is hereby incorporated by reference.

FIELD

The present disclosure relates generally to the field of data communications.

BACKGROUND

Some communications systems transmit ancillary data, which can serve different purposes, for example to send information about the status of different elements in the system or to allow changing configuration of devices that are remotely connected. Some systems have a high number of interconnections, so it is desirable not to add more channels, which could be difficult to route, and that would require supplemental pins on the electronic devices.

Filters have been used in existing high-speed connections to carry extra information such as ancillary data on a separate channel or frequency spectrum. These filters however do not perfectly eliminate the deleterious effects of the ancillary data on the high-speed message channel, and reduce the performance of the latter due to information leaking from the ancillary data channel into the high-speed message channel, the leaking information being perceived as noise in the high-speed message channel. Leakage from the message channel into the ancillary data channel can also affect the performance of the ancillary data channel.

A further disadvantage associated with the use of filters relates to the discontinuities associated with the connection of the filters, and the impedance of these circuits, which cause undesirable effects on the high-speed channel.

Transmitting ancillary data also usually requires additional transmitter and receiver circuits for transmission and decoding of the information to be sent and received.

It is desirable to provide a data communications system that overcomes these problems associated with the transmission of ancillary data.

DETAILED DESCRIPTION

Figure 1:
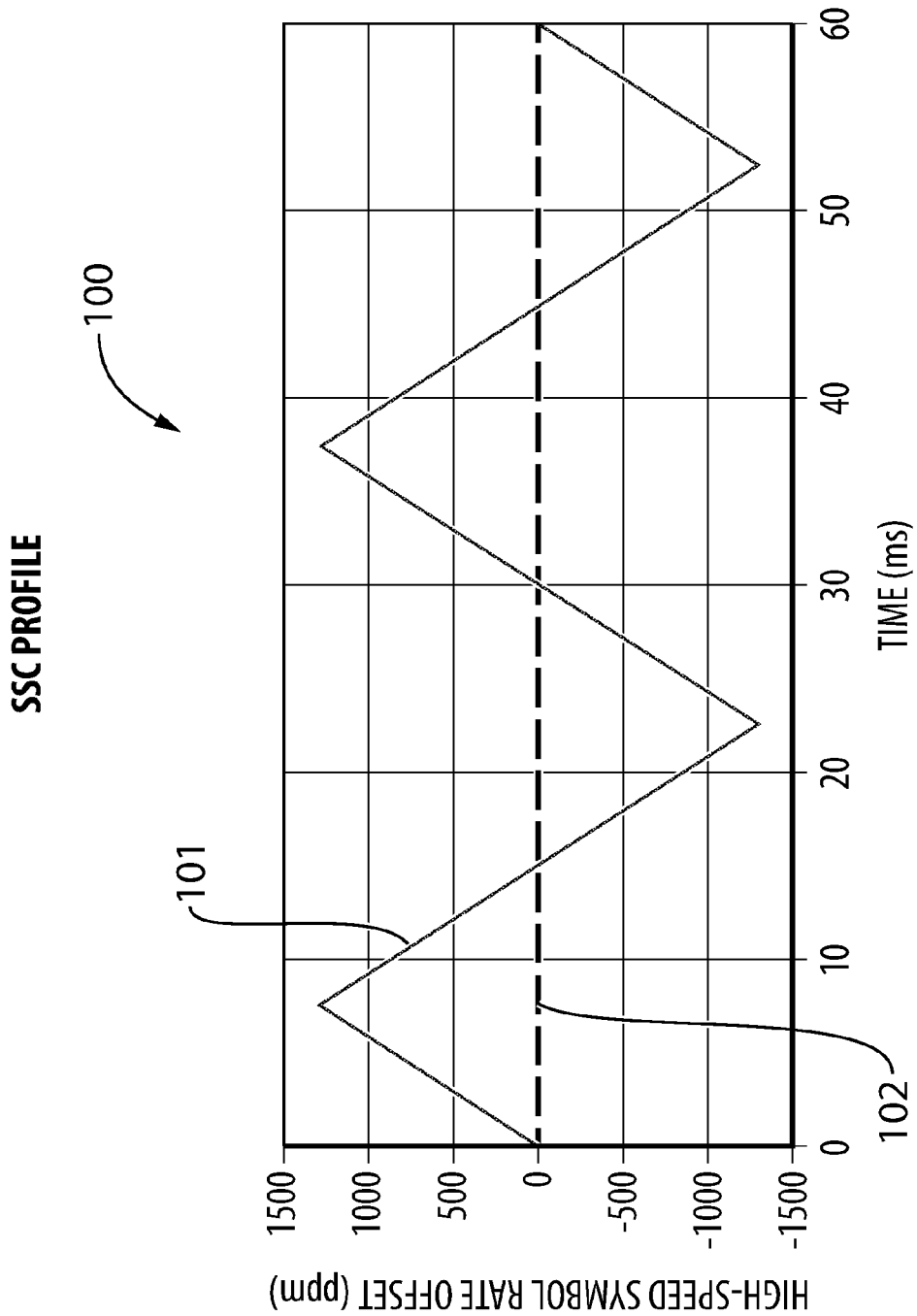
FIG. 1 is a graph showing an exemplary spread-spectrum clocking (SSC) profile.

The present disclosure provides, in an embodiment, a method for encoding ancillary information at a transmitter in a high-speed communications network, the method comprising: generating an electromagnetic interference (EMI) reduction signal; receiving an ancillary data symbol; generating an EMI reduction signal variation based on the ancillary data symbol; and varying a characteristic of the obtained EMI reduction signal based on the generated EMI reduction signal variation to encode the ancillary data symbol in the varied EMI reduction signal.

In a further embodiment of the present disclosure, the EMI reduction signal comprises a spread-spectrum clocking (SSC) profile, and generating the EMI reduction signal variation comprises generating an SSC profile variation; and varying the characteristic of the EMI reduction signal comprises varying the SSC profile according to the SSC profile variation.

In a yet further embodiment of the present disclosure, varying the SSC profile comprises mapping the received ancillary data symbol to a peak-to-peak amplitude variation of the SSC profile.

In a yet further embodiment of the present disclosure, the SSC profile variation comprises a maximum peak amplitude, and a minimum peak amplitude having an equal magnitude and opposite polarity to the maximum peak amplitude.

In a yet further embodiment of the present disclosure, the SSC profile variation comprises a maximum peak amplitude, and a minimum peak amplitude having a different magnitude and opposite polarity to the maximum peak amplitude.

In a yet further embodiment of the present disclosure, varying the SSC profile comprises mapping the received ancillary data symbol to a symbol duration variation of the SSC profile.

In a yet further embodiment of the present disclosure, the duration of the SSC profile variation is delineated by times when an instantaneous symbol rate offset of the transmitter is equal to a nominal symbol rate of the transmitter.

In a yet further embodiment of the present disclosure, varying the SSC profile comprises mapping the received ancillary data symbol to both a peak-to-peak amplitude variation and a symbol duration variation of the SSC profile.

In a yet further embodiment of the present disclosure, the duration of the SSC profile variation is delineated by times when an instantaneous symbol rate offset of the transmitter is equal to a nominal symbol rate of the transmitter.

In a yet further embodiment of the present disclosure, the SSC profile variation comprises a maximum peak amplitude, and a minimum peak amplitude having an equal magnitude and opposite polarity to the maximum peak amplitude.

In a yet further embodiment of the present disclosure, the SSC profile variation comprises a maximum peak amplitude, and a minimum peak amplitude having a different magnitude and opposite polarity to the maximum peak amplitude.

In a yet further embodiment of the present disclosure, the method further comprises transmitting an EMI-reduced message signal at a symbol rate, the symbol rate specified by the EMI reduction signal.

In a yet further embodiment of the present disclosure, the method further comprises: assessing the quality of the EMI-reduced message signal; and selecting an SSC profile to reach a target quality for the EMI-reduced message signal.

In a yet further embodiment of the present disclosure, the EMI-reduced message signal includes padding to adjust an average EMI-reduced message signal symbol rate to a target range.

In a yet further embodiment of the present disclosure, the symbol rate is substantially similar to a nominal symbol rate of the transmitter.

Another embodiment of the present disclosure provides a method for decoding ancillary information at a receiver in a high-speed communications network, the method comprising: receiving an EMI-reduced message signal transmitted with an EMI reduction signal, the EMI reduction signal having an EMI reduction signal variation encoding an ancillary data symbol; extracting the EMI reduction signal variation at a demodulator; and decoding the ancillary data symbol from the extracted EMI reduction signal variation at a decoder.

In a further embodiment of the present disclosure, the EMI reduction signal comprises a spread-spectrum clocking (SSC) profile, and receiving the EMI reduction signal comprises receiving an SSC profile; extracting the EMI reduction signal variation comprises extracting an SSC profile variation; and decoding comprises decoding the ancillary data symbol from the extracted SSC profile variation.

In a yet further embodiment of the present disclosure, decoding comprises comparing the SSC profile variation to a mask corresponding to the ancillary data symbol.

In a yet further embodiment of the present disclosure, decoding comprises comparing a peak-to-peak amplitude of the SSC profile variation to an expected peak-to-peak amplitude corresponding to the ancillary data symbol.

In a yet further embodiment of the present disclosure, the method further comprises: receiving a pilot symbol; and correcting the extracted SSC profile variation according to the pilot symbol.

In a yet further embodiment of the present disclosure, the method further comprises correcting the extracted SSC profile variation by the difference between the magnitude of the maximum peak and the magnitude of the minimum peak of the extracted SSC profile variation, the expected magnitude of the maximum peak equal to the expected magnitude of the minimum peak.

In a yet further embodiment of the present disclosure, the method further comprises correcting the extracted SSC profile variation by the average magnitude of the extracted SSC profile variation, the expected average magnitude equal to zero.

In a yet further embodiment of the present disclosure, decoding comprises comparing a peak-to-peak duration of the extracted SSC profile variation to an expected peak-to-peak duration corresponding to the ancillary data symbol.

In a yet further embodiment of the present disclosure, the method further comprises: selecting an EMI reduction signal variation bin corresponding to the extracted EMI reduction signal variation, the EMI reduction signal bin being a nominal value mapped to a range of EMI reduction signal variation values; and decoding, at a decoder, the ancillary data symbol from the selected EMI reduction signal variation bin.

In a yet further embodiment of the present disclosure, the range of EMI reductions signal variation values is at least twice the expected maximum constant difference between a received symbol rate and a transmitted symbol rate.

In a yet further embodiment of the present disclosure, the SSC profile has a constant cycle duration, and the SSC profile comprises a plurality of sections, the sum of the durations of all the SSC profile sections being equal to the constant cycle duration of the SSC profile.

Another embodiment of the present disclosure provides a transmitter for transmitting ancillary information in a high-speed communications network, the transmitter comprising: an input configured to receive a message; an encoder configured to: obtain an electromagnetic interference (EMI) reduction signal; receive an ancillary data symbol; generate an EMI reduction signal variation based on the ancillary data symbol; vary a characteristic of the obtained EMI reduction signal based on the generated EMI reduction signal variation to encode the ancillary data symbol in the varied EMI reduction signal; a modulator configured to vary a symbol rate of the transmitter based on the varied EMI reduction signal; and an output configured to transmit the message according to the varied symbol rate.

In a further embodiment of the present disclosure, the EMI reduction signal comprises a spread-spectrum (SSC) profile, and the processor: generates an SSC profile variation; and varies the SSC profile according to the SSC profile variation.

In a yet further embodiment of the present disclosure, the transmitter further comprises a transmitter for transmitting an EMI-reduced message signal at a symbol rate, the symbol rate specified by the EMI reduction signal.

In a yet further embodiment of the present disclosure, the processor: assesses the quality of the EMI-reduced message signal; and selects an SSC profile to reach a target quality for the EMI-reduced message signal.

Another embodiment of the present disclosure provides a receiver for decoding ancillary information in a high-speed communications network, the receiver comprising: an input configured to receive an EMI-reduced message signal transmitted at a time-varying symbol rate, the time-varying symbol rate based on an EMI reduction signal variation encoding an ancillary data symbol; a clock recovery circuit configured to operate in a clock recovery mode to demodulate the time-varying symbol rate of the EMI-reduced message signal, and to operate in a data extraction mode to extract the EMI reduction signal variation; and a decoder for decoding the ancillary data symbol from the extracted EMI reduction signal variation.

In a further embodiment of the present disclosure, the EMI reduction signal comprises a spread-spectrum clocking (SSC) profile, and the demodulator extracts an SSC profile variation; and the decoder decodes the ancillary data symbol from the SSC profile variation.

In a yet further embodiment of the present disclosure, the clock recovery circuit comprises: a phase error detector for comparing a received symbol rate to a local reference clock signal and computing a phase error between the received symbol rate and the local reference clock signal; an accumulator for summing phase errors; and a multiplier for multiplying the output of the accumulator by a constant value to obtain an instantaneous symbol rate.

In a yet further embodiment of the present disclosure, the signs of the phase errors are used for the summation.

Reference to specific elements of various embodiments of the present disclosure will now be made.

FIG. 1 is a graph showing an exemplary spread-spectrum clocking (SSC) profile 100. SSC profile 100 shows the instantaneous message symbol rate offset 101 of a message data signal relative to its nominal symbol rate 102, expressed as a parts-per-million (ppm) ratio, over time. The term "SSC profile" will be used herein to refer to the characteristics of a transmitter's message symbol rate offset, relative to the transmitter's nominal symbol rate. The symbol rate of a message to be transmitted may be expressed as a bit rate, representing the number of bits transmitted per second, or more generally as a symbol rate, measured in baud, representing the number of symbols transmitted per second. A symbol is a message pattern representing an integer number of bits. Therefore, depending on the modulation scheme of a communications system, the instantaneous and nominal symbol rates of the SSC scheme may refer to a symbol rate or to a bit rate. While a baud is a measure of symbol rate, the term "baud rate" is often used interchangeably with symbol rate. The present disclosure uses baud rate and symbol rate interchangeably.

SSC is a means to reduce electromagnetic emissions (EMI) over a narrow frequency band. These emissions are often subject to norms and regulations, for which SSC can be used to obtain compliance. Generally, SSC comprises a low-frequency variation of the average baud rate of a transmitter over time, which varies the instantaneous frequency of an undesirable EMI spur, lowering the peak radiation of the transmitter.

Figure 2:
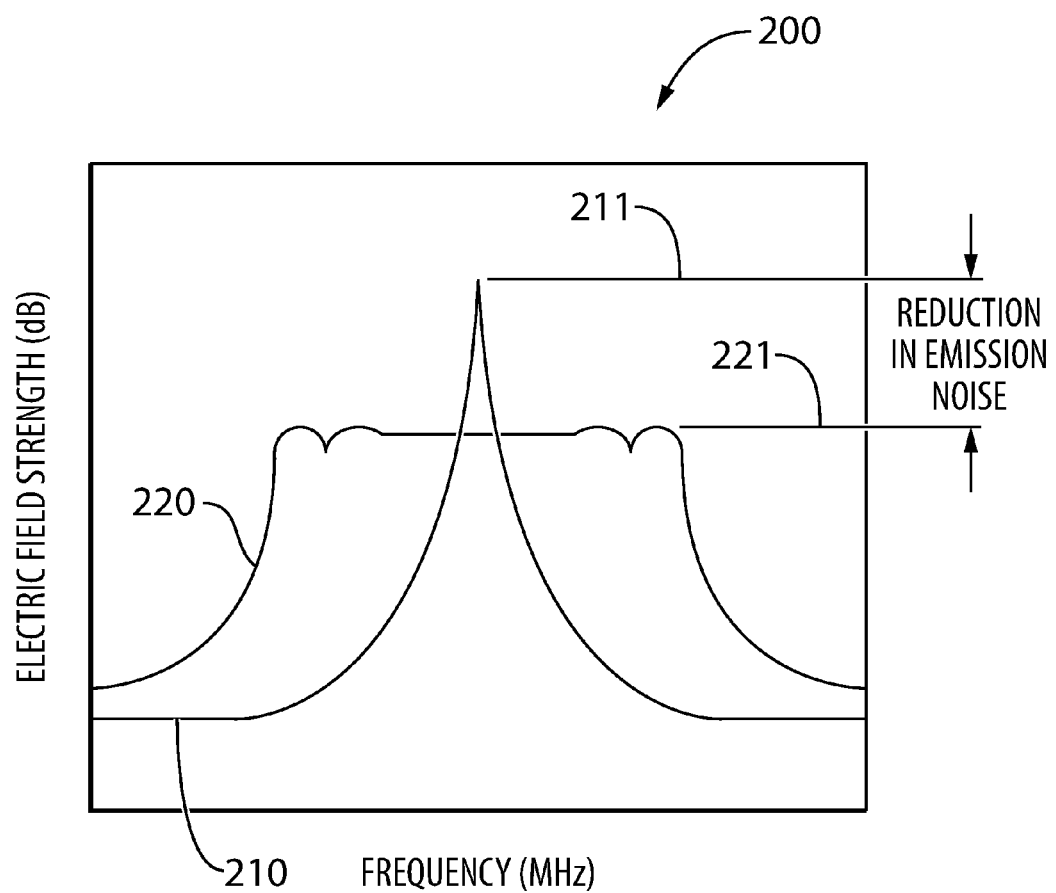
FIG. 2 is a graph showing the frequency spectra of a signal having SSC and a signal without SSC.

FIG. 2 is a graph 200 showing the effect of SSC in reducing an EMI spur. Spectral line 210 shows an exemplary EMI frequency spectrum of a transmitted signal without SSC. Because the transmit clock is a constant value, the transmitted signal produces a peak EMI spur 211 in spectrum 210. Spectral line 220 shows an exemplary EMI frequency spectrum of a signal transmitted with SSC. Varying the transmit symbol rate averages the EMI power across the frequency spectrum and lowers the peak EMI value 221 of spectrum 220. The reduction in peak EMI is shown as the difference between peak 211 and peak 221.

The SSC profiles used for EMI reduction are typically single-pattern symbol rate modulation profiles, whose modulation cycle duration, maximal symbol rate excursion, average symbol rate and maximal rate of change of the symbol rate are described by the given transmission protocol.

The symbol rate of a message transmitted with SSC has to be constantly modified to provide measured EMI reduction. A repeating SSC profile provides the necessary constant variations for EMI reduction. Furthermore, symbol rate variations of an SSC profile are bounded to a small fraction of the nominal symbol rate (typically below +/−1%).

The variation of the message symbol rate over time imposes constraints on clock recovery circuits. Since the average symbol rate varies over time, the clock recovery circuit is typically designed to tolerate the full range of the message symbol rate.

Figure 3:
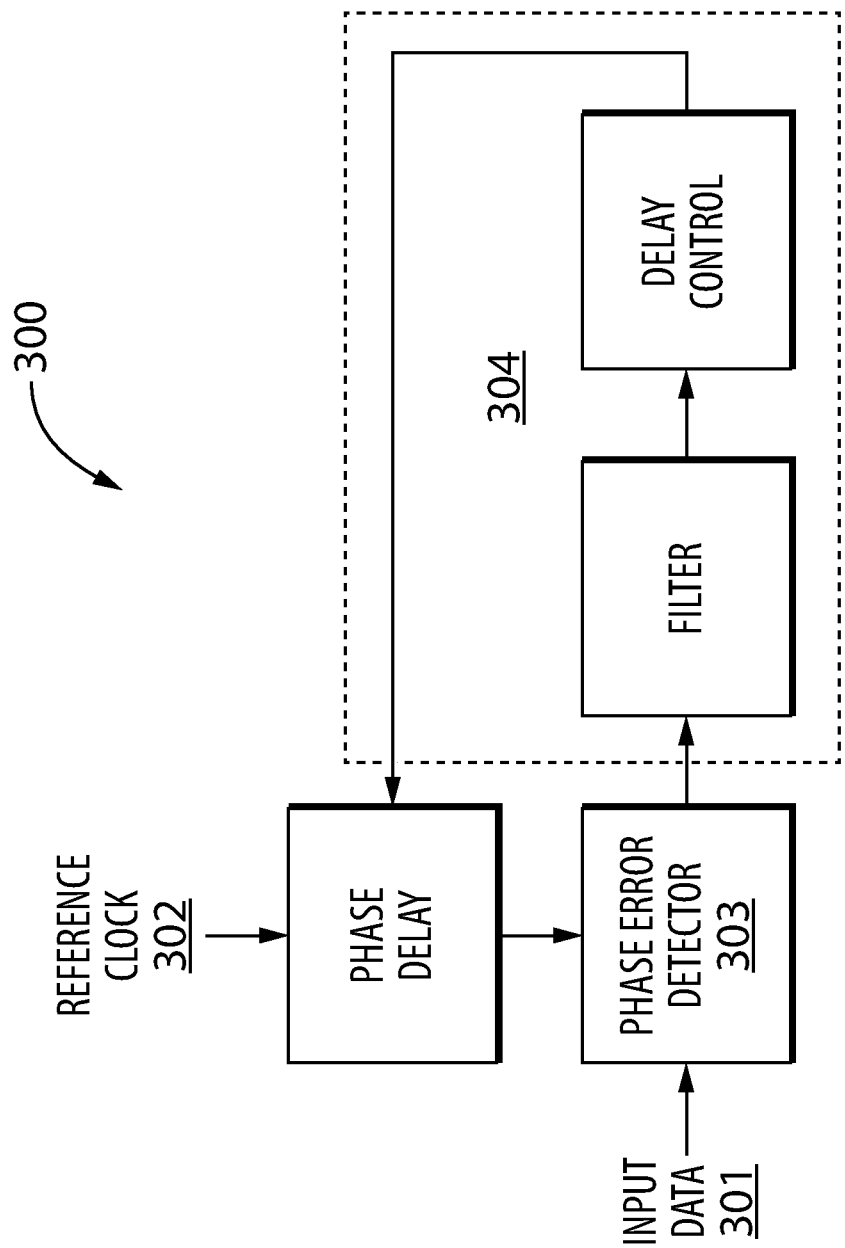
FIG. 3 is a block diagram of an exemplary clock recovery circuit known in the art.

FIG. 3 shows a clock recovery circuit 300 according to an embodiment of the present disclosure. Clock recovery circuit 300 contains a phase error detector 303 between the input data 301 and the reference clock 302, and a feedback loop 304 that seeks to minimize this error. In a conventional communication system, a type-I feedback loop may be sufficient when SSC is not enabled. Once settled, such systems will track limited static symbol rate offsets between the receiver and the transmitter. However, when SSC is enabled, a type-II feedback loop is typically required.

Figure 4:
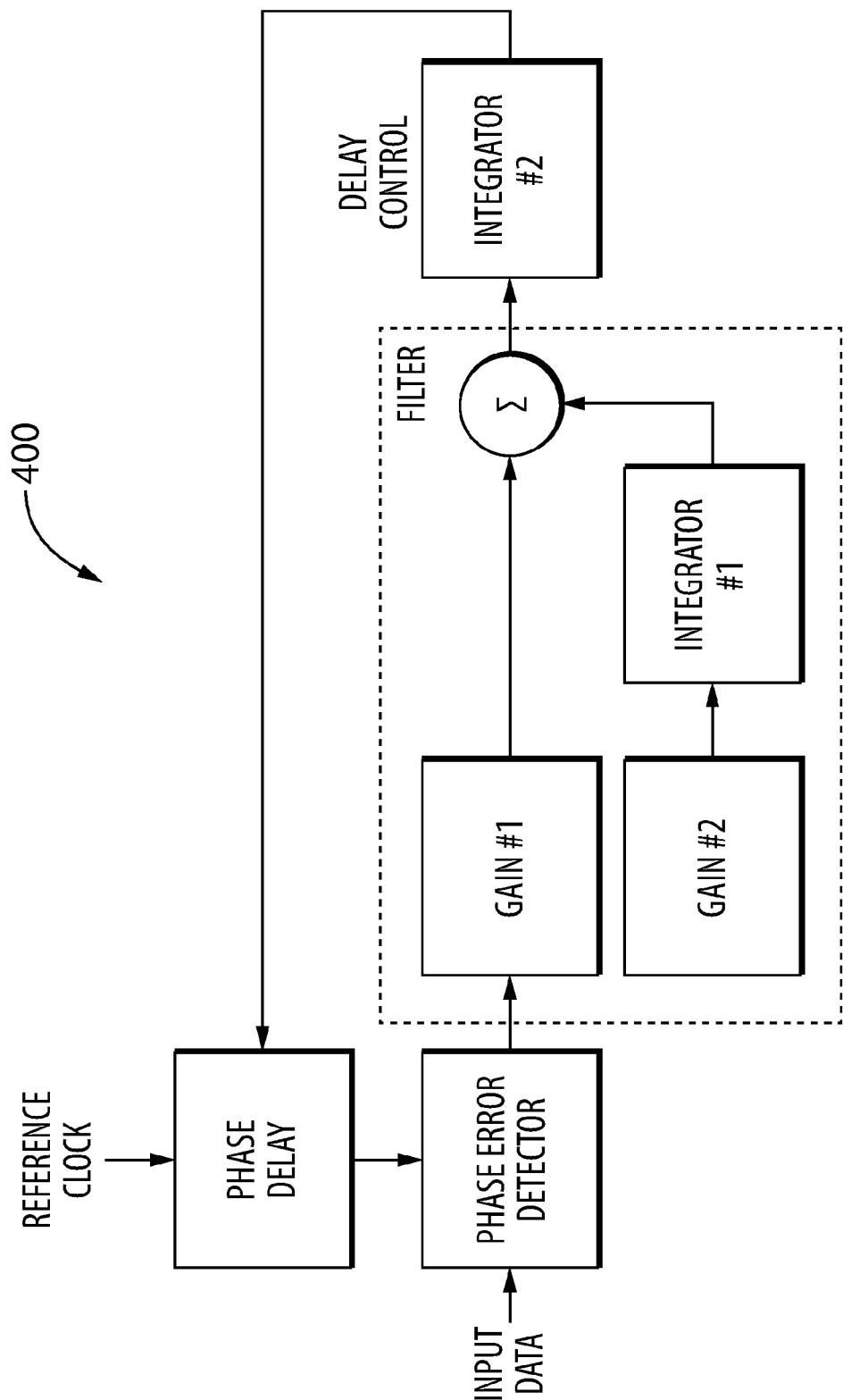
FIG. 4 is a block diagram of an exemplary type-II clock recovery circuit known in the art.

FIG. 4 shows an exemplary type-II clock recovery circuit according to an embodiment of the present disclosure. Within selected high-speed symbol rate limits, type-II clock recovery circuit 400 can track a constant rate of change of the message symbol rate with a limited error. Transmission protocols that support SSC describe these requirements, which limit the amount of SSC-induced jitter on the recovered data.

Conventionally, ancillary data, which is data separate from message data, transmitted and received on a separate frequency channel, must be decoded from the carrier by filters, which reduces the performance of the communications system and increases transmitter and receiver complexity. Ancillary data can be referred to as low-speed data. Message data can be referred to as high-speed data.

In an embodiment of the present disclosure, the spread-spectrum clocking mechanism of a communications system is used to transmit ancillary data, in addition to providing EMI spur frequency dispersion for the high-speed transmission. The changes in instantaneous symbol rate over the nominal symbol rate, that are a feature of conventional SSC and that describe an SSC profile herein, are modulated in amplitude, frequency, shape, or a combination thereof, to carry the ancillary data signal from a high-speed transmitter to a high-speed receiver.

For transmission protocols that support SSC, the transmission of this supplemental ancillary information can be made fully protocol-compliant by ensuring that the characteristics imposed on the SSC profile are respected by the transmitter modulator. Advantageously, a receiver according to an embodiment of the present disclosure can decode the ancillary data from the received signal without the need for the additional filter circuits necessitated by a conventional separate frequency channel ancillary data transmission scheme. By decoding ancillary data through the use of the components of the typed I clock recovery circuit typically present in SSC-compliant receivers, embodiments of the present disclosure make more efficient use of receiver circuit components.

Figure 5:
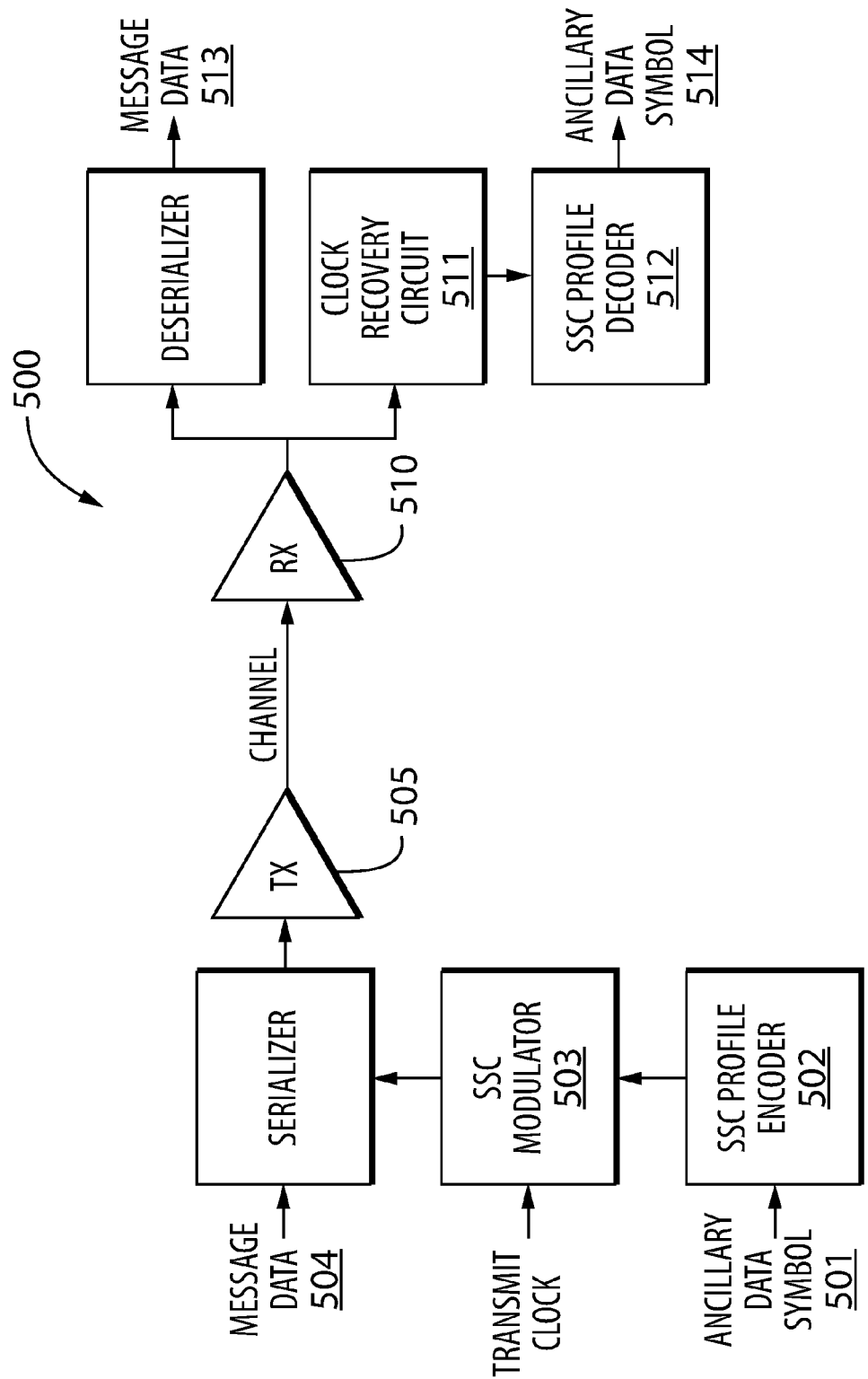
FIG. 5 is a block diagram of a communication system according to an embodiment of the present disclosure.

FIG. 5 is a block diagram of a communication system 500 according to an embodiment of the present disclosure. An SSC profile encoder 502 receives an ancillary data symbol 501 and generates an SSC profile variation based on the ancillary data symbol 501. The encoder 502 varies at least one characteristic of an SSC profile based on the SSC profile variation to encode the ancillary data symbol 501 in the varied SSC profile. An SSC modulator 503 uses the time-varying SSC profile, which includes the encoded ancillary data symbol 501, to modulate the message data 504 at transmitter 505 for transmission. The transmitted message signal includes SSC to reduce peak EMI and also includes the encoded ancillary data symbol. Receiver 510 receives the transmitted EMI-reduced message signal at a time-varying symbol rate. A clock recovery circuit 511 operating in a clock recovery mode demodulates the time-varying symbol rate of the EMI-reduced signal in order to recover the nominal symbol rate of the transmitter for deserializing the received message data 513. The clock recovery circuit 511 also operates in a data extraction mode to extract the SSC profile variation from the time-varying symbol rate. The SSC profile decoder 512 decodes the extracted SSC profile variation by demapping or comparing the extracted SSC profile variation to an expected SSC profile variation corresponding to an ancillary data symbol, thus recovering the transmitted ancillary data 514.

Figure 6:
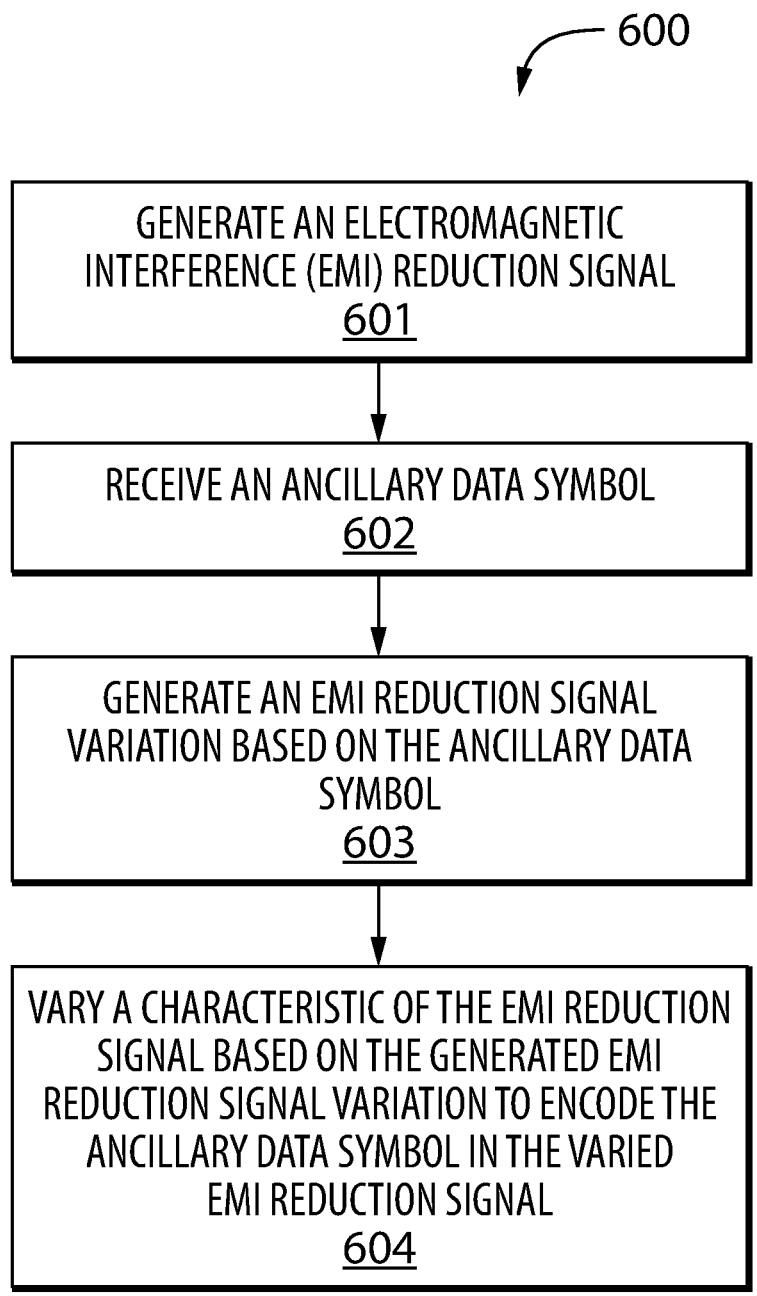
FIG. 6 is a flowchart of a method to encode ancillary data according to an embodiment of the present disclosure.

FIG. 6 is a flowchart of a method 600 to encode ancillary data according to an embodiment of the present disclosure. At 601, an encoder generates an electromagnetic interference (EMI) signal. At 602, the encoder receives an ancillary data symbol. At 603, the encoder generates an EMI reduction signal variation based on the ancillary data symbol. For example, the generated variation may be a variation in the peak amplitude of the EMI reduction signal. At 604, the encoder varies a characteristic of the EMI reduction signal based on the generated EMI reduction signal variation to encode the ancillary data symbol in the varied EMI reduction signal. For example, a given ancillary data symbol causes encoder to vary the EMI reduction signal such that the signal has a maximum peak of 200 ppm and a minimum peak of −200 ppm. In an embodiment, the EMI reduction signal is an SSC-compliant symbol rate offset profile (SSC profile), and the EMI reduction signal variation is a variation of the SSC profile.

Figure 7:
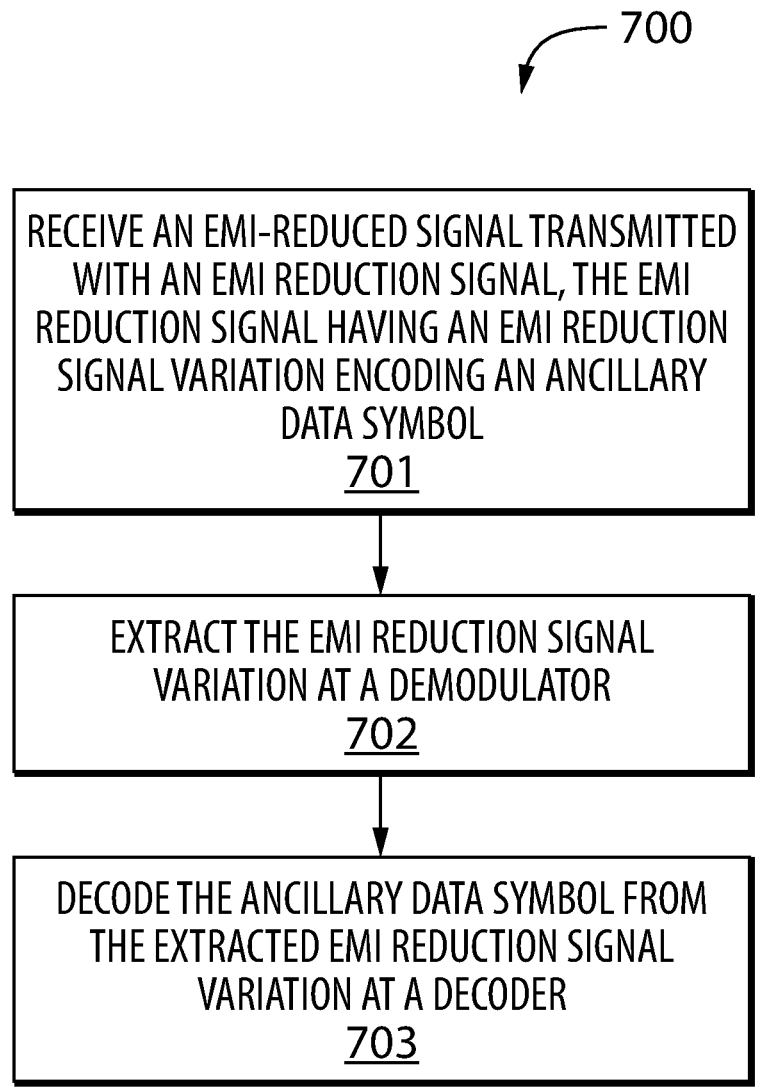
FIG. 7 is a flowchart of a method to decode ancillary data according to an embodiment of the present disclosure.

FIG. 7 is a flowchart of a method 700 to decode ancillary data according to an embodiment of the present disclosure. At 701, the decoder receives an EMI-reduced message signal transmitted with an EMI reduction signal, the EMI reduction signal having an EMI reduction signal variation encoding an ancillary data symbol. At 702, the decoder extracts the EMI reduction signal variation at a demodulator. At 703, the decoder decodes the ancillary data symbol from the extracted EMI reduction signal variation. In an embodiment, the EMI reduction signal is an SSC-compliant symbol rate offset profile (SSC profile), and the EMI reduction signal variation is a variation of the SSC profile.

The transmission of ancillary information through the SSC profile modulator 503 can take a plurality of forms: amplitude modulation, instantaneous symbol duration modulation, or a combination of both. The rate of change of the symbol rate (i.e., the slope of the SSC profile) can also be used. Furthermore, since the SSC profile is defined over a relatively long duration (i.e., modulation at a low frequency, in the range of a few 10's of kHz), the overall shape of the SSC profile can be used to carry information, because decoding can be performed with masks or complex algorithms. Error correction codes and similar techniques can be used to extend the bandwidth of the ancillary data transmission and improve noise immunity. Limitations on the type of modulation may however be imposed by constraints from the high-speed protocol regarding SSC profile characteristics and clock recovery performance.

Figure 8:
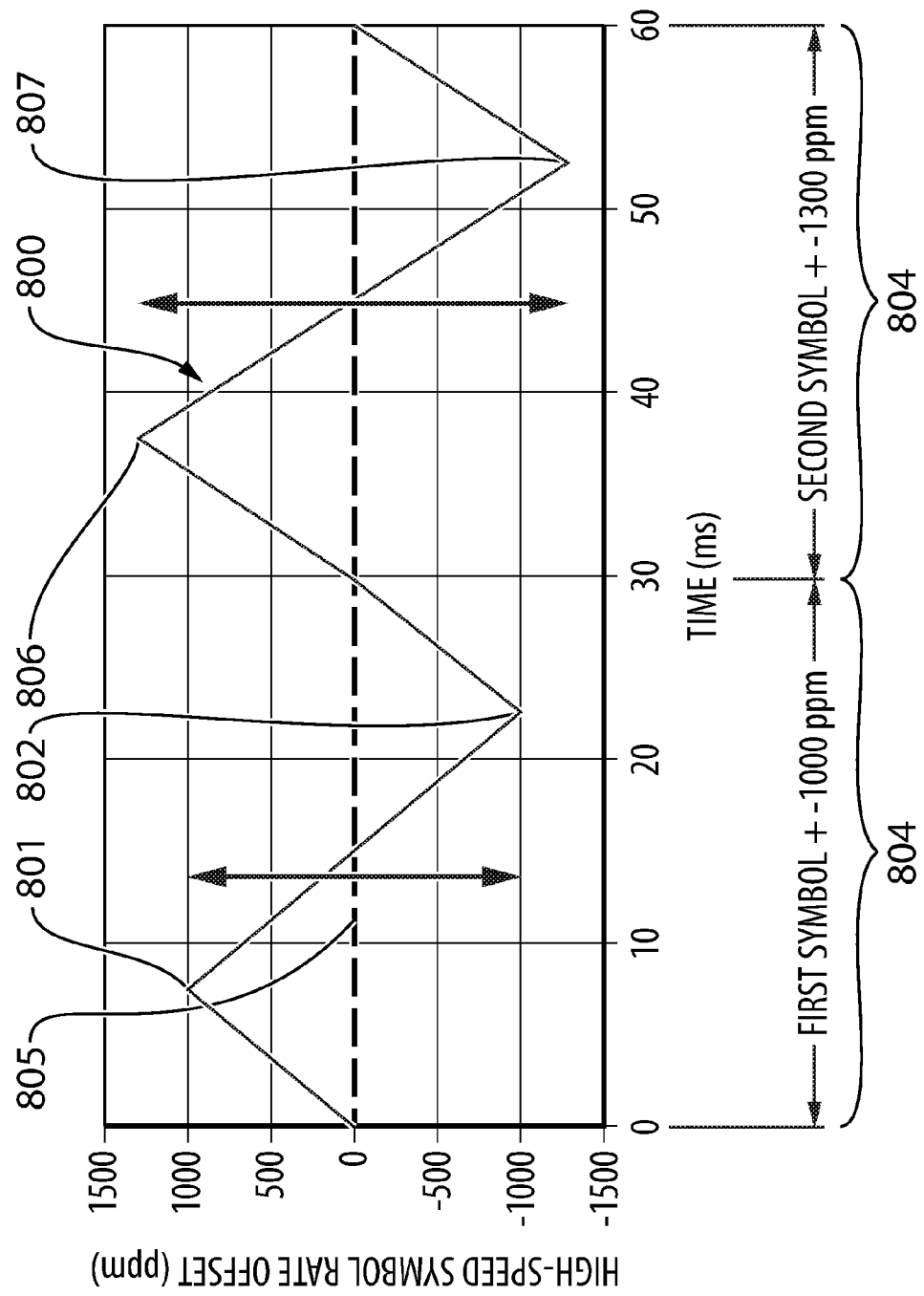
FIG. 8 is a graph showing an SSC profile variation encoding ancillary data according to an embodiment of the present disclosure.

FIG. 8 is a graph describing an embodiment of the present disclosure wherein the ancillary information is encoded as a modulation of the amplitude of the SSC profile variation. Both the positive and negative excursions of the SSC profile 800 are of equal magnitude; that is, the maximum peak 801 value is equal to the absolute value of the minimum peak value 802. However the maximum peak 806 of the next SSC profile variation may not be equal to maximum peak 801; similarly, the minimum peak 807 of the next SSC profile variation may not be equal to minimum peak 802. The SSC profile variation has a duration 804 that is constant from one SSC profile variation to the next. This encoding method advantageously removes any constant symbol rate offset between the transmitter and the receiver. If a symbol rate offset exists between the reference symbol rate of a transmitter and that of the receiver, it will equally affect both the minimum and the maximum excursions demodulated by the receiver. By using the difference between the maximum and the minimum excursions of the extracted SSC profile variation as the first decoding step, any constant symbol rate offset between the transmitter and the receiver's reference symbol rate will be removed.

In a further embodiment, each ancillary data symbol is delineated where the instantaneous symbol rate offset of the SSC profile crosses a nominal symbol rate axis 805 with a specified slope polarity. In the example of FIG. 8, the SSC profile from 0 ms to 30 ms shows a first SSC profile variation representing a first ancillary data symbol, and the SSC profile from 30 ms to 60 ms shows a second SSC profile variation representing a second ancillary data symbol. At the 30 ms point, the instantaneous symbol rate offset crosses the nominal symbol rate axis 805 with a positive slope, indicating the transition from the first ancillary data symbol to the second ancillary data symbol.

Figure 9:
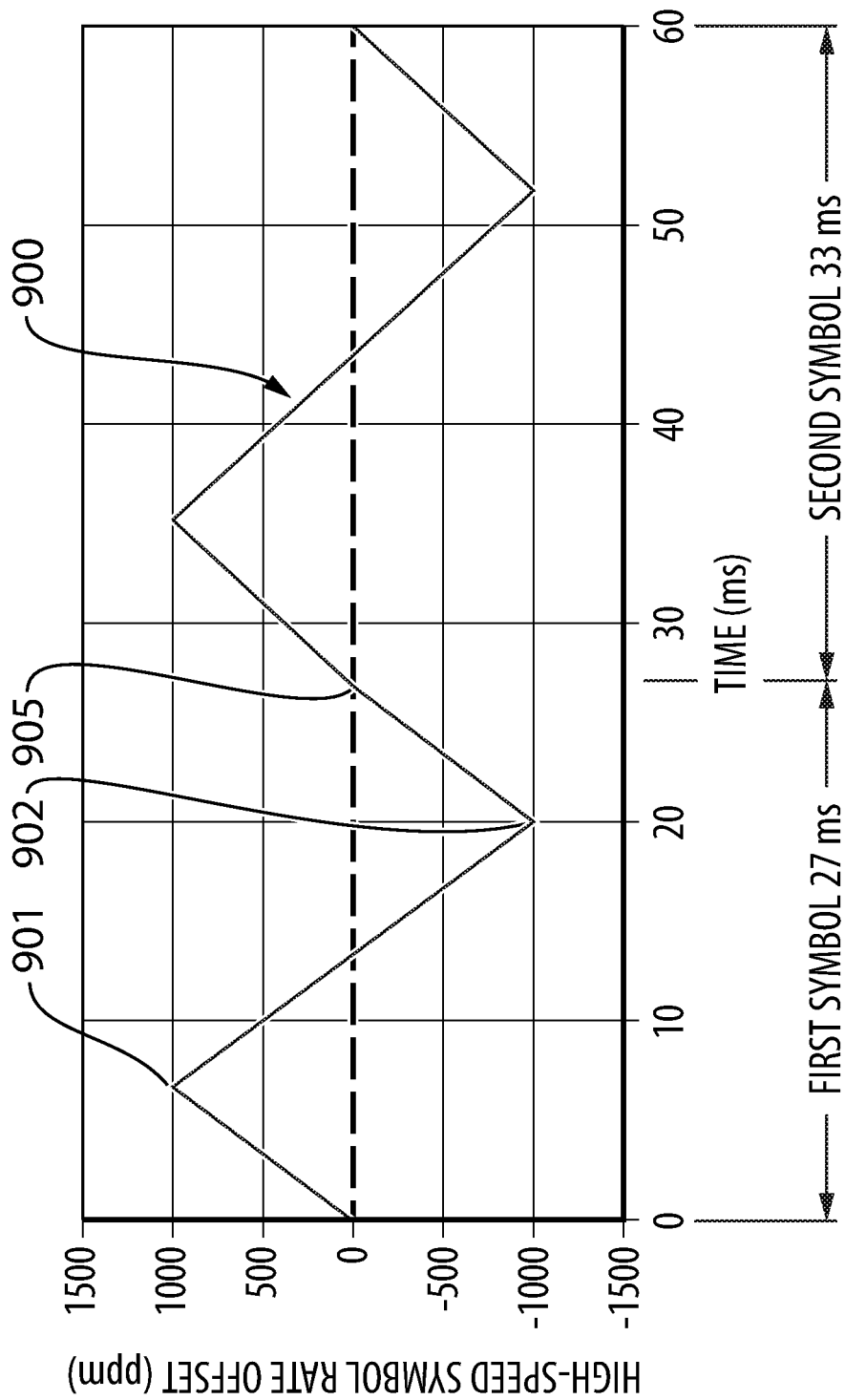
FIG. 9 is a graph showing an SSC profile variation encoding ancillary data according to an embodiment of the present disclosure.

FIG. 9 is a graph describing an embodiment of the present disclosure wherein the ancillary information is encoded as a variation of cycle duration of the SSC profile. This encoding method can be detected at the receiver by monitoring the time between two events of the SSC profile 900. In a further embodiment, the encoding relates to the time between instants 905 where the SSC profile variation crosses the nominal symbol rate axis.

In another embodiment, the encoding relates to the time between the instants at which the SSC profile variation reaches a maximum peak 901 and the time at which it reaches a minimum peak 902, or vice versa. According to this embodiment, measuring the duration of the SSC profile variation using maximum and minimum peak values as references can provide immunity to constant message symbol rate offset between the receiver and the transmitter. In a further embodiment, the duration of the SSC profile variation is extracted by measuring the time difference between the maximum and the minimum peaks of the SSC profile variation, when the symbol rate changes after the minimum peak and before the maximum peak. In another further embodiment, the duration of the SSC profile variation is extracted by measuring the time difference between the minimum and the maximum peaks of the SSC profile, when the symbol rate changes after the maximum peak and before the minimum peak.

The detection of SSC profile variation peak values (maximum and minimum) can be affected by noise or slow variations of the measured SSC profile variation in these areas. In addition to affecting decoding the amplitude of the SSC profile variation, peak detection noise can also affect decoding the cycle duration of the SSC profile variation. In the cycle duration detection method above, comprising measuring the time between a maximum peak and a minimum peak, the noise associated with peak detection will cause ambiguity in the detection of the cycle duration. Therefore, in a further embodiment, the cycle duration of the SSC profile variation is determined by measuring the time between points when the SSC profile variation crosses a reference threshold with a certain (positive or negative) slope. For example, the cycle duration may be determined by detecting a first time when the SSC profile variation magnitude crosses the nominal zero axis from the negative half to the positive half, detecting a second time when the SSC profile variation magnitude crosses the nominal zero axis from the negative half to the positive half, and measuring the time between the first and second detections. In another method, the SSC profile variation is filtered by a low-pass filter to remove high-frequency noise. These methods for determining the cycle duration of an SSC profile variation are applicable to encoding methods disclosed herein that rely on a variation of the cycle duration of an SSC profile.

In the various embodiments of FIG. 9, although the allowed range of the duration of the SSC profile variation may be relatively narrow, its low frequency nature (10's of kHz) can lead to a large number of quantized levels that can be detected precisely, and thus lead to a significant contribution to the number of ancillary data bits that can be encoded in each SSC profile variation.

Figure 10:
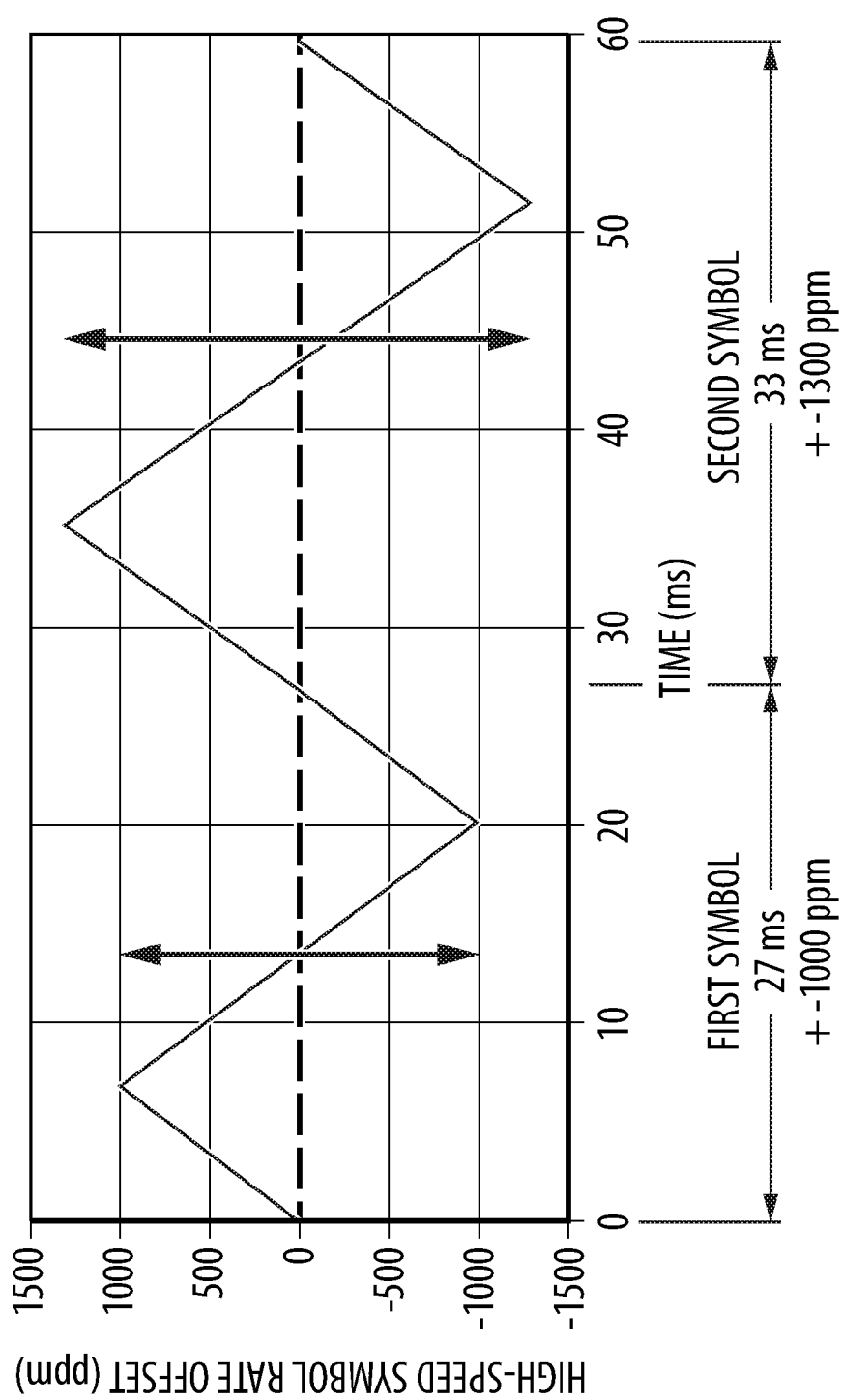
FIG. 10 is a graph showing an SSC profile variation encoding ancillary data according to an embodiment of the present disclosure.

FIG. 10 is a graph describing an embodiment of the present disclosure wherein the encoding schemes described in FIG. 8 and FIG. 9 are combined to produce a two-dimensional constellation. This encoding method retains the immunity to constant symbol rate offsets from the method described in FIG. 8. When no constant symbol rate offset between the transmitter and the receiver exists, both maximum and minimum peak values of the SSC profile variation extracted by the receiver are expected to be of equal magnitude. When a symbol rate offset exists between the transmitter and receiver, the constant symbol rate offset between the receiver and the transmitter can be measured by averaging the maximum and the minimum peak values of the extracted SSC profile variation, preferably over a large number of SSC profile variation cycles.

Figure 11:
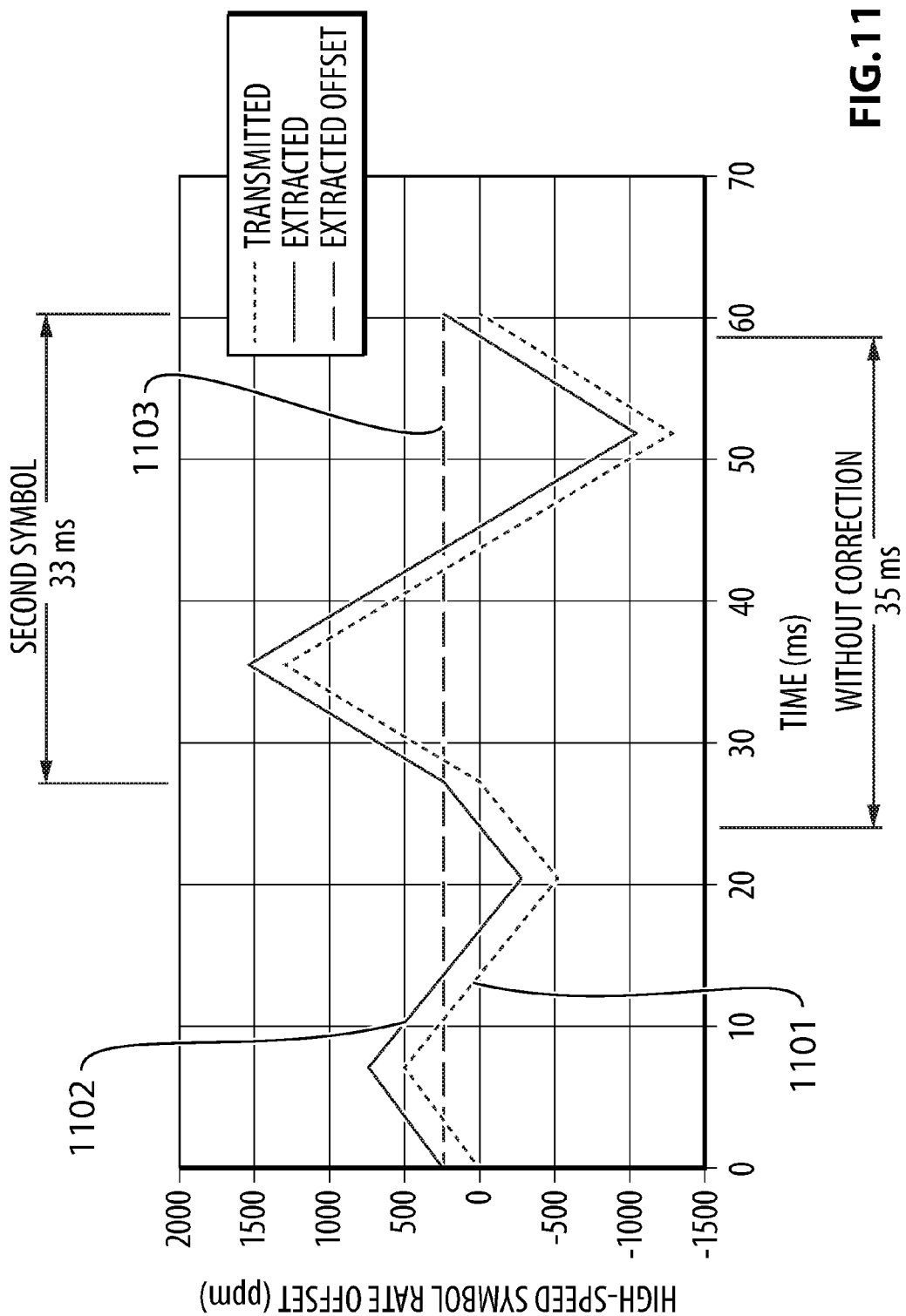
FIG. 11 is a graph showing the extraction of a received SSC symbol rate offset according to an embodiment of the present disclosure.

FIG. 11 is a graph showing that this extracted average symbol rate offset can be used as the threshold for a trigger to measure time instants to compute the duration of the SSC profile variation, reducing the error of the transmitted ancillary data. Assuming that the same reference clock is used on the transmitter side both to generate the nominal message symbol rate and to generate the instantaneous symbol rate specified by SSC profile variation 1101, the extracted SSC profile variation 1102 duration will scale according to the extracted average message symbol rate offset 1103. Therefore, according to the present embodiment, the extracted SSC profile variation duration is adjusted according to the measured constant symbol rate offset between the transmitter and the receiver.

A further embodiment method can change the encoding according to the error rate received. The number of SSC profile variation amplitude levels, the number of SSC profile variation duration levels, and whether one or two ancillary data symbols are sent per SSC profile variation can be adjusted to provide a target error rate of the ancillary data.

Figure 12:
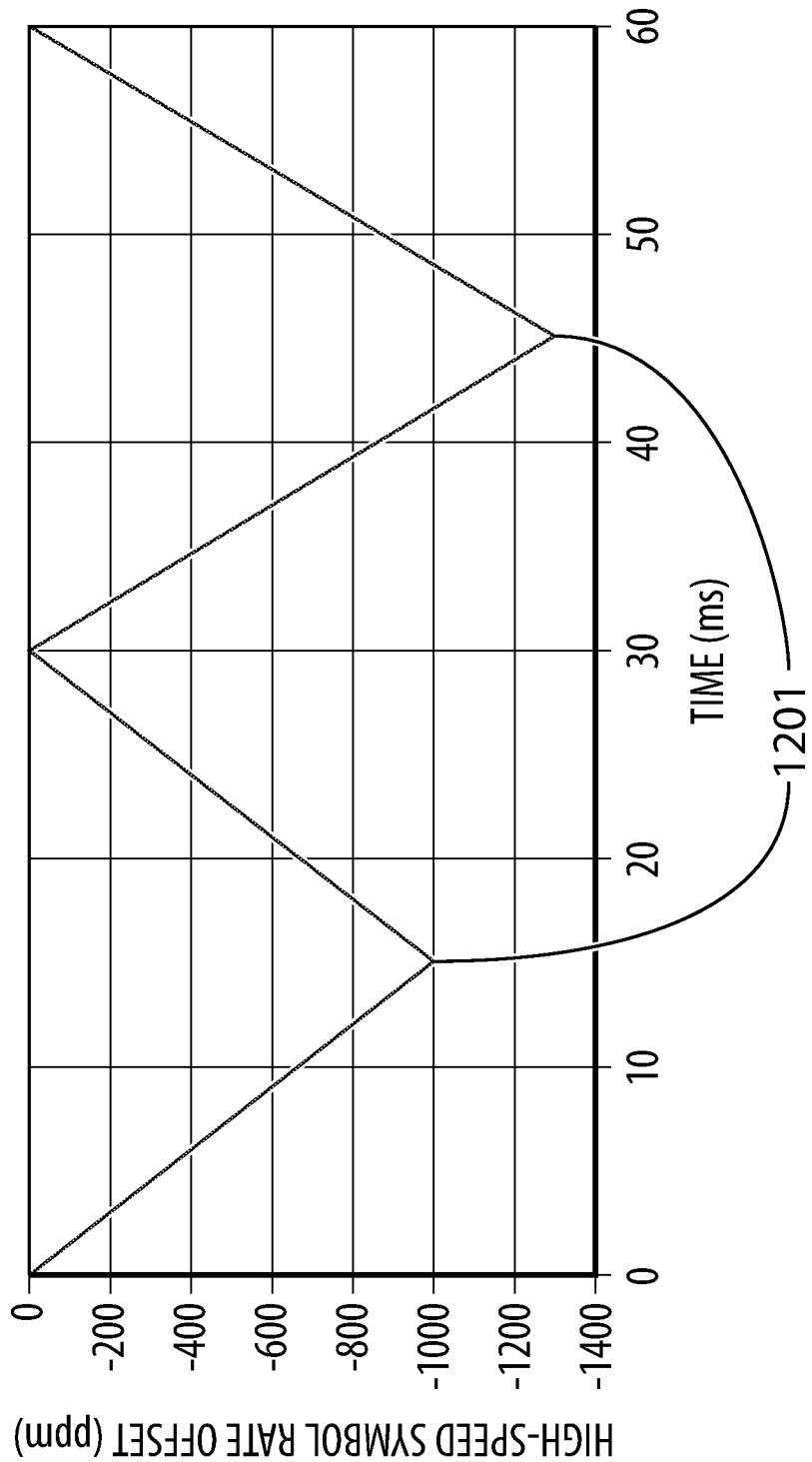
FIG. 12 is a graph showing an SSC profile variation encoding ancillary data according to an embodiment of the present disclosure.

FIG. 12 is a graph describing an embodiment of the present disclosure wherein the ancillary information is encoded as a modulation of the SSC profile variation minimum peak value 1201 only, while keeping the maximum peak value constant. The exemplary SSC profile of FIG. 12 having only a downspread modulation is compliant with SSC modulation protocols that require a fixed maximum value.

Figure 13:
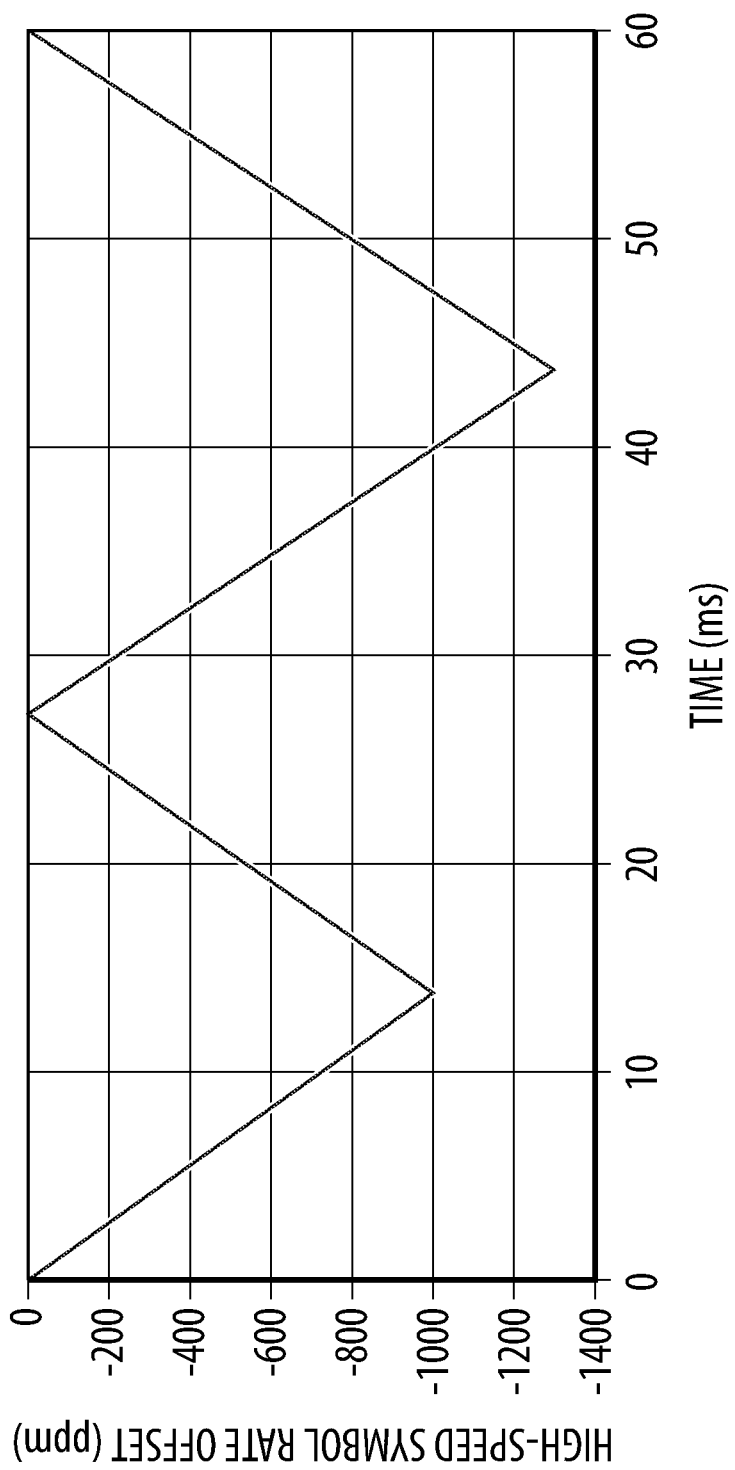
FIG. 13 is a graph showing an SSC profile variation encoding ancillary data according to an embodiment of the present disclosure.

FIG. 13 is a graph describing an embodiment of the present disclosure wherein the encoding schemes described in FIG. 9 and FIG. 12 are combined to produce a two-dimensional constellation. The embodiments of FIG. 12 and FIG. 13 are similar to the embodiments of FIG. 8 and FIG. 10, respectively, but are adapted for cases where the SSC profile is constrained to have a fixed maximum or minimum peak value. In the embodiments of FIG. 12 and FIG. 13, it is not possible to use the nominal symbol rate offset crossing of the SSC profile variation, or to use the SSC profile variation average offset, to measure the cycle duration of the SSC profile variation. However, the modulation of only a minimum or maximum SSC profile symbol peak value will still allow for the same encoding methods discussed previously.

Figure 14:
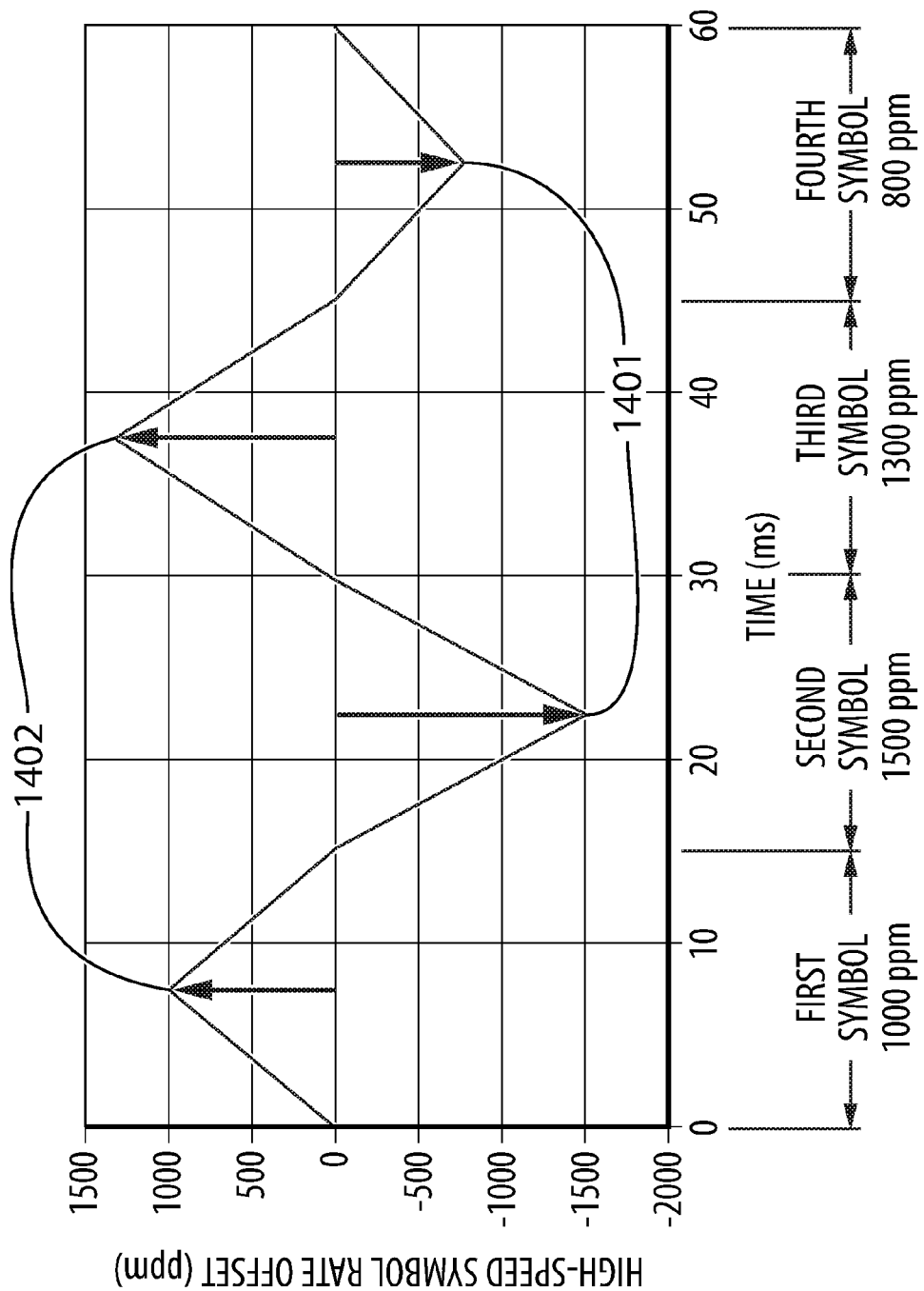
FIG. 14 is a graph showing an SSC profile variation encoding ancillary data according to an embodiment of the present disclosure.

FIG. 14 is a graph describing an embodiment of the present disclosure wherein the ancillary information is encoded as a modulation of the SSC profile variation peak values. The peak value may be a maximum 1402 or a minimum 1401, but unlike the embodiments of FIG. 12 and FIG. 13, the embodiment of FIG. 14 is not constrained to a constant maximum value or a constant minimum value. The cycle duration of each SSC profile variation is constant; therefore, each ancillary data symbol has the same duration.

Figure 15:
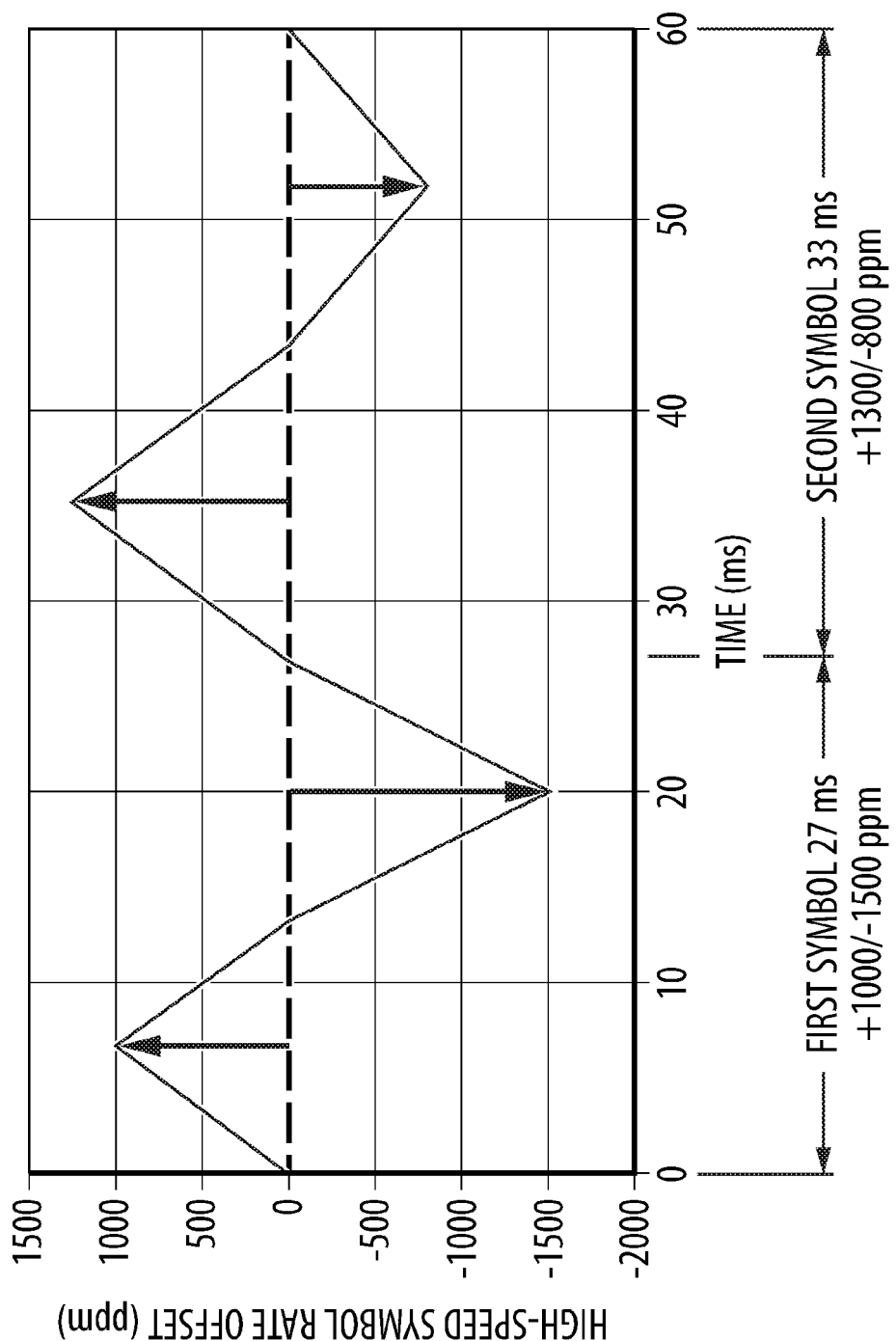
FIG. 15 is a graph showing an SSC profile variation encoding ancillary data according to an embodiment of the present disclosure.

FIG. 15 is a graph describing an embodiment of the present disclosure wherein the SSC profile provides three degrees of freedom, allowing more ancillary data bits to be encoded in each SSC profile variation. The ancillary data is encoded as the modulation of the cycle duration of the SSC profile variation, and as modulation of both a maximum peak value and minimum peak value of the SSC profile symbol values, the modulation of the duration, the modulation of the maximum peak, and the modulation of the minimum peak values each being independent. The exemplary SSC profile of FIG. 15 shows two separate SSC profile variations, representing two ancillary data symbols. The first SSC profile variation is demonstrated by a first maximum peak (1000 ppm), a first minimum peak (−1500 ppm) and a first cycle duration (27 ms); the second SSC profile variation is demonstrated by a second maximum peak (1300 ppm), a second minimum peak (−700 ppm) and a second cycle duration (33 ms).

The extraction of the constant symbol rate offset between the transmitter and the receiver is more difficult because the received signal cannot be averaged to determine a constant symbol rate offset between the expected symbol rate and the received symbol rate. This constant symbol rate offset is necessary to reduce the error rate at the receiver according to the embodiment of FIG. 11. Therefore, in other exemplary implementations of the embodiments of FIG. 14 and FIG. 15, pilot symbols are sent at predefined instants. These pilot symbols have defined characteristics that allow the receiver to compute any variation so as to compensate the measured characteristics of the SSC profile variations received afterward. For example, the difference between the extracted maximum value of the SSC profile symbol and the expected maximum value can be used to compute the constant symbol rate offset between the receiver and the transmitter.

Those skilled in the art will recognize that many variants exist for sending pilot symbols, for example sending them at link initialization, periodically, after a predefined pattern, upon request by the far-end, or by a combination of methods. The number of different pilot symbols sent for addressing different characteristics of the signal and the repetition of pilot symbols to reduce errors in their detection through averaging are design trade-offs to take into account, as they effectively reduce the ancillary data bit rate, at the benefit of improved reliability.

Pilot symbols can also carry some payload information, for example by modulating the duration of the SSC profile variation, while forcing the maximum and minimum values of the SSC profile variation to have equal but opposite magnitudes, as described in the embodiment of FIG. 9. This allows extraction of the constant symbol rate offset, while still carrying ancillary information encoded in the variation of the duration of the SSC profile. Therefore, in an embodiment, the pilot symbol used in the SSC transmission method of FIG. 14 or FIG. 15 is the SSC modulated signal in the embodiment of FIG. 9.

Pilot symbols can be used to calibrate the extracted SSC profile symbol duration for any of the embodiments of FIG. 9, 10, 13, 15 or 16.

The embodiments of FIG. 12 and FIG. 14 can modulate the transmitter symbol rate such that its average will not be zero, and this average value may vary according to the transmitted SSC profile variation. Those skilled in the art will recognize that this situation may require periodic bit insertion or bit removal, and care must be taken not to exceed specified limits of the message transmission protocol used. Some coding schemes transmit compensation bits or symbols to ensure that the average symbol rate offset introduced by the SSC modulation is kept within acceptable limits.

Figure 16:
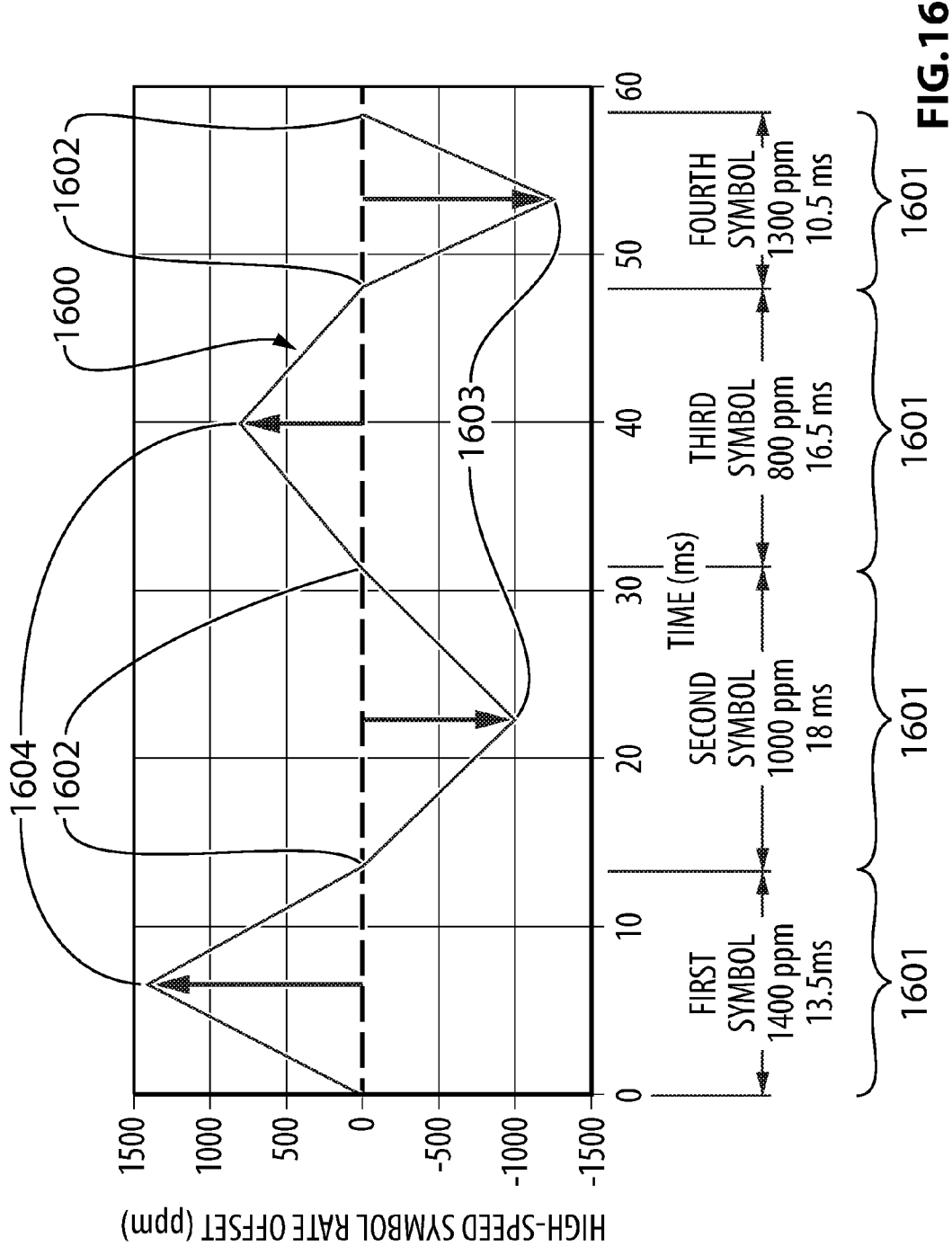
FIG. 16 is a graph showing an SSC profile variation encoding ancillary data according to an embodiment of the present disclosure.

FIG. 16 is a graph describing an embodiment of the present disclosure wherein the ancillary information is encoded in both the modulation of the amplitude and modulation of the duration of the SSC profile variation 1600. In this embodiment, the SSC profile variation 1600 duration is detected by the receiver at zero crossings 1602 of the SSC profile variation amplitude with the nominal symbol rate axis. The ancillary information is further encoded as a modulation of either the SSC profile variation minimum peak 1603 or maximum peak 1604, similarly to the embodiment of FIG. 14.

In the operation of an embodiment communications system, the SSC profiles of the various foregoing embodiments can be achieved with minimal or no modification over known communications systems. Thus, most current communications systems can be adapted to provide both SSC-compliant peak EMI reduction and carry ancillary data in a high-speed channel without separate channel filters.

Referring back to FIG. 5, the transmitter does not require any additional circuitry. The SSC modulator only needs to be modified to accept the encoded SSC profile variation described in the various embodiments of the present disclosure. The SSC modulator 503 is typically a relatively low-speed digital circuit, so adding supplemental logic can be performed at a low cost to both power and complexity. The SSC profile encoder 502 is also implemented as a relatively low-speed digital circuit.

Those skilled in the art will recognize that both the SSC modulator 503 and the SSC profile encoder 502 circuits can be realized in a number of ways, particularly through RTL code synthesis or even using computer programs.

Receivers that support SSC typically have a type-II feedback loop. Those skilled in the art will recognize that this type of feedback loop typically contains a frequency tracking circuit, which tracks the high-speed baud rate offset of the received signal with respect to an internal reference. This circuit thus provides a signal proportional to the SSC profile and the SSC profile variation, as extracted from the incoming high-speed signal. This SSC profile variation is decoded by additional decoding circuits. Decoding is a relatively low-speed process that can be realized through digital synthesis or computer programs.

Figure 17:
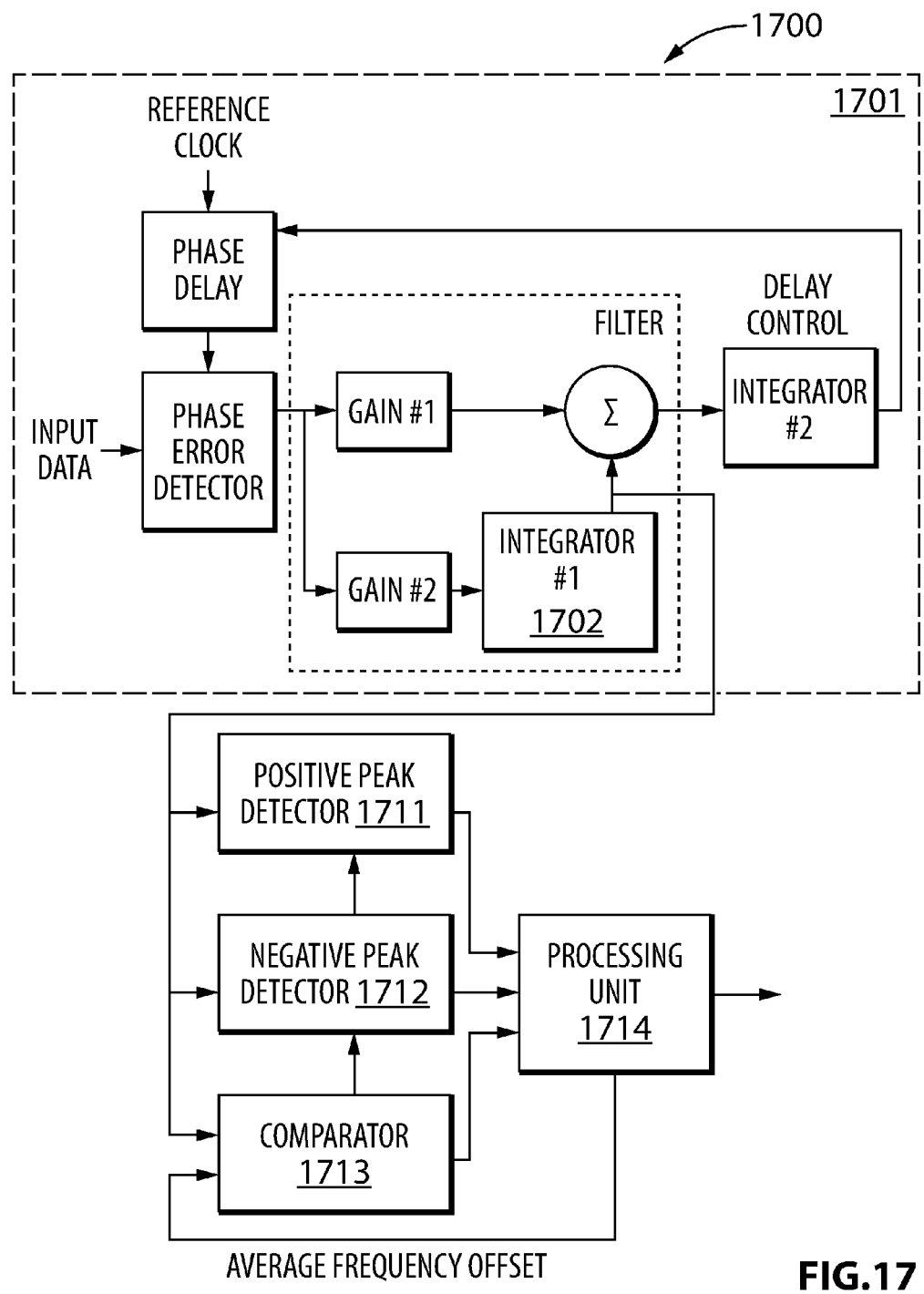
FIG. 17 is a block diagram of a decoder according to an embodiment of the present disclosure.

FIG. 17 is a block diagram of a receiver 1700 according to an embodiment of the present disclosure. Receiver 1700 comprises a type-II clock recovery loop 1701. The output of integrator 1702 is extracted as a signal proportional to the SSC profile variation. In a further embodiment, a scaling factor is used to modify the amplitude to get the extracted SSC profile variation; in a different embodiment, no scaling factor is used and the decision thresholds or masks are scaled by the inverse proportion of the scaling factor. The output of integrator 1702 can thus be considered as the extracted SSC profile variation.

Receiver further comprises a positive peak detector 1711 circuit to detect the time at which the extracted SSC profile variation reaches a maximum peak amplitude, and to also detect the amplitude. This is done by comparing the current SSC profile variation with previous values and retaining the largest value and its corresponding instant from an internal time base. Those skilled in the art will recognize that this detection can be performed in a number of ways. In an embodiment, the peak detection method includes: (a) sending a strobe signal to the processor when a larger value is found, the processor recording the internal time; (b) detecting from samples of the SSC profile variation, or working from a digitized SSC profile variation; (c) filtering the SSC profile variation before detecting its maximum value to remove noise; and (d) resetting the detector after a given amount of time, for example half the expected average SSC profile variation duration, to be ready to capture the next cycle's maximum value.

Negative peak detector 1712 circuit functions similarly to the positive peak detector circuit, but detects the minimum amplitude and its occurrence instant.

Comparator 1713 circuit compares the SSC profile variation with a threshold value set by the processing unit 1704, and outputs a signal indicating that the SSC profile variation is larger than this threshold.

Processing unit 1714 collects the information from the above circuits and implements the demodulation of the SCC profile variation.

Receiver 1700 is similar to a conventional SSC-compliant receiver in that receiver 1700 includes a type-II clock recovery circuit 1701; however, receiver 1700 can further decode ancillary data transmitted according to an embodiment of the present disclosure by augmenting clock recovery circuit 1701 with a positive peak detector 1711, a negative peak detector 1712, a comparator 1713, and a processing unit 1714. Thus, with the addition of the foregoing circuits, a conventional SSC-compliant receiver can be designed to decode ancillary data transmitted in the method of the present disclosure.

In an exemplary embodiment, an SSC profile is chosen to have 4 amplitude levels and 8 SSC profile variation durations. Thus, the ancillary data is grouped in sets of 32 symbols that are each mapped to one unique combination (i.e. symbol) of the SSC amplitude levels and SSC variation duration. The selected SSC profile variation is then used to modulate the reference clock to transmit the message over the communication system of FIG. 5.

Figure 18:
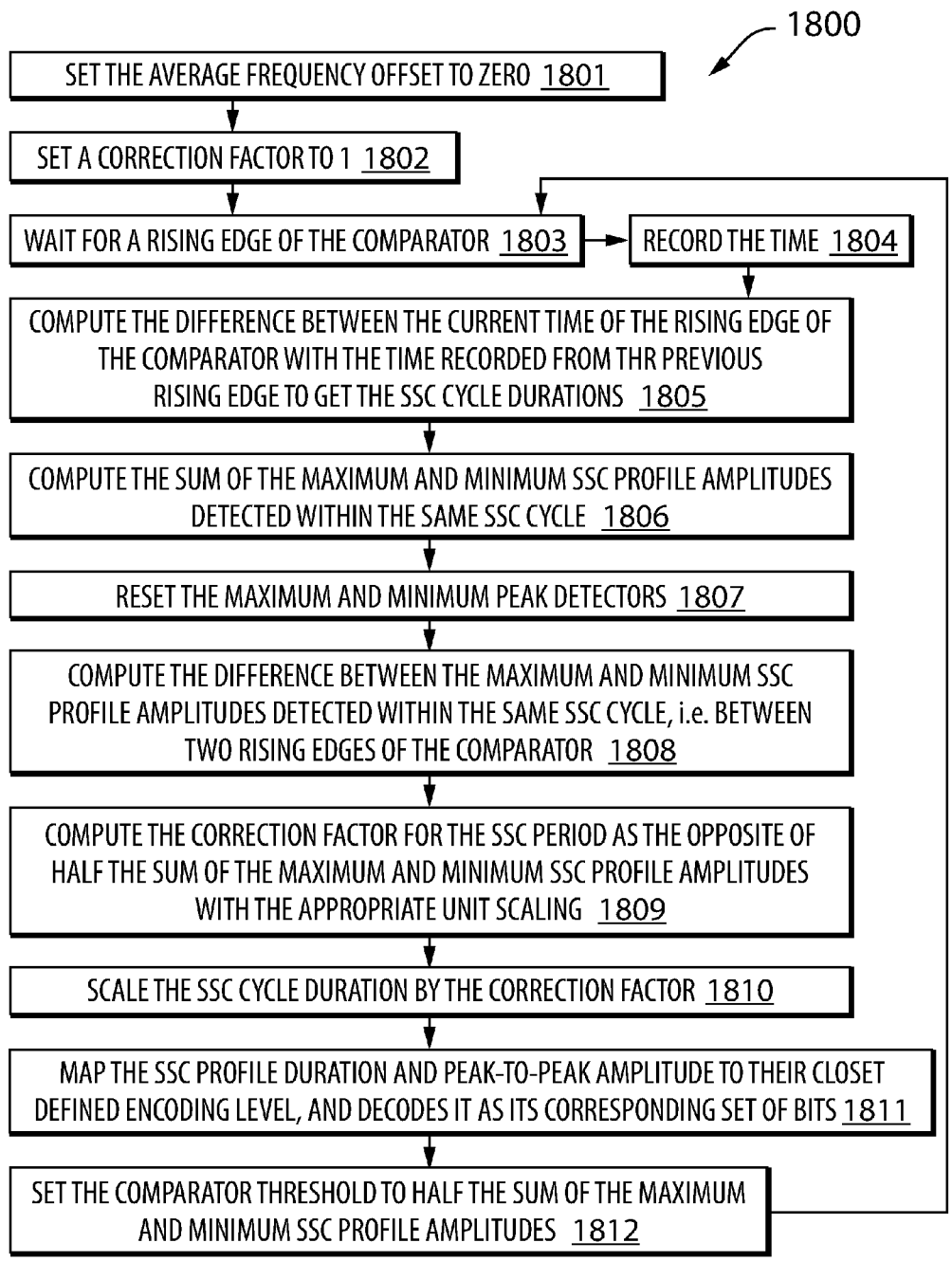
FIG. 18 is a flowchart of an SSC decoding method for decoding ancillary data from an SSC profile symbol according to an embodiment of the present disclosure.

FIG. 18 is a flowchart of method 1800, which is performed by receiver of FIG. 17 after it receives the SSC profile variation. At 1801, processing unit sets the average symbol rate offset signal to zero. At 1802, processing unit sets a correction factor to 1. At 1803, processing unit waits for a rising edge of the comparator. At 1804, processing unit records the time. At 1805, processing unit computes the difference between the maximum and minimum SSC profile variation peak amplitudes detected within the same SSC profile variation, i.e. between two rising edges of the comparator. At 1806, processing unit computes the sum of the maximum and minimum SSC profile variation amplitudes detected within the same SSC profile variation. At 1807, processing unit resets the maximum and minimum peak detectors. At 1808, processing unit computes the difference between the current time of the rising edge of the comparator with the time recorded from the previous rising edge to get the SSC profile variation duration. At 1809, processing unit computes the correction factor for the SSC profile variation duration as the opposite of half the sum of the maximum and minimum SSC profile variation peak amplitudes, with the appropriate unit scaling. At 1810, processing unit scales the SSC profile variation duration by the correction factor. At 1811, processing unit maps the SSC profile variation duration and peak-to-peak amplitude to their closest defined encoding level, and decodes the ancillary data from the corresponding set of ancillary data symbols. At 1812, processing unit sets the comparator threshold to half the sum of the maximum and minimum SSC profile variation peak amplitudes. This concludes a first processing unit cycle and processing unit loops back to 1803.

The preceding embodiments describe methods of encoding and decoding the ancillary data within any generic SSC profile The transmitter and the receiver shown in FIG. 5 is configured to perform the methods of encoding and decoding described above for the particular SSC profile chosen. The necessary configuration and components of the transmitter and receiver for a chosen SSC profile would be known to a person of skill in the art.

For example, in an embodiment, a low-pass filter before peak detectors and comparator aids in removing noise in the receiver.

In an embodiment of the present disclosure, the processing unit receives directly, or after filtering, the SSC profile variation, and compares it to a mask. In another embodiment, processing unit performs the peak detection and comparison. In another embodiment, processing unit performs other decoding functions based on the SSC profile variation characteristics. The relevant characteristics of an SSC profile variation characteristics can include, peak maximum and minimum values, slope, and duration In the embodiments of the present disclosure, the transition density of the received data stream directly affects the ratio between the frequency tracking accumulator and the modulated symbol rate of the input signal since the phase error detector outputs a null value when no transition is present. This problem can be compensated by scaling the phase error signal by a number that represents the number of consecutive identical symbols transmitted before the current transition. The average transition density can also be computed and used for scaling, in case it is assumed constant. In systems where multiple symbols are processed together in a set to generate a combined phase error signal representing the sum of the phase error signal for all symbols in the set, this compensation scaling can represent the average number of consecutive identical symbols before each of the transitions contained in the set.

In a further embodiment of the present disclosure, communications system 500 is a duplex communications system. A controller on each transmit and receive side of the duplex communications system evaluates the quality of the ancillary data signal received through the high-speed signal transmitted according to the spread-spectrum clocking methods of the present disclosure. The controller then determines whether the symbol rate should be increased, decreased, or maintained. This determination can be made, for example, by comparing the quality of the received ancillary data signal against thresholds of a pre-determined metric. The controller at the receiver side of the duplex communications system can send specific instructions to the transmitter using a duplex link to request increments or decrements in the symbol rate.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a hardware product implemented in an Integrated Circuit (IC), Programmable Gate Array, or some combination of Integrated Circuit(s), Programmable Gate Array(s), and Software. Those of ordinary skill in the art will appreciate that other functions can also be implemented on such Integrated Circuits or Programmable Gate Arrays.

The above-described embodiments are intended to be examples only. Alterations, modifications and variations can be effected to the particular embodiments by those of skill in the art without departing from the scope, which is defined solely by the claims appended hereto.

What is claimed is:

1. A spread spectrum clock (SSC) generator comprising:
  an SSC modulator for generating a spread spectrum clock signal based on a modified SSC profile, the spread spectrum clock signal comprising a variation of a reference clock signal according to the modified SSC profile; and
  an SSC profile modifier in communication with the SSC modulator, for receiving an ancillary data and modifying an SSC profile associated with the SSC modulator according to the ancillary data symbol to generate the modified SSC profile, wherein the variation of the reference clock signal of the spread spectrum clock signal is uniquely mapped to the ancillary data symbol via the modified SSC profile,
  wherein the SSC generator is connected to a transmitter for transmitting a message at a plurality of frequencies according to the spread spectrum clock signal, and the ancillary data symbol is encoded within a sequence of the frequencies of the plurality of frequencies used for transmitting the message.

2. The SSC generator of claim 1, wherein modifying the SSC profile comprises modifying a peak-to-peak amplitude of the SSC profile.

3. The SSC generator of claim 1, wherein the SSC profile has a period and modifying the SSC profile comprises modifying a duration of the period of the SSC profile.

4. The SSC generator of claim 1, wherein the SSC profile has a period and modifying the SSC profile comprises modifying both a peak-to-peak amplitude of the SSC profile and the duration of the period of the SSC profile.

5. The SSC generator of claim 1, wherein:
  the SSC profile is a periodic function;

the SSC profile modifier modifies the function over a plurality of periods, according to a plurality of ancillary data symbols; and the SSC modulator generates the spread spectrum clock signal based on the modified SSC profile such that the spread spectrum clock signal comprises periodic variations of the reference clock signal corresponding to the plurality of ancillary data symbols.

6. The SSC generator of claim 2, wherein the peak-to-peak amplitude comprises a maximum peak amplitude, and a minimum peak amplitude having an equal magnitude and opposite polarity to the maximum peak amplitude.

7. The SSC generator of claim 2, wherein the peak-to-peak amplitude comprises a maximum peak amplitude, and a minimum peak amplitude having a different magnitude and opposite polarity to the maximum peak amplitude.

8. The SSC generator of claim 3, wherein the reference clock signal defines a nominal frequency, the SSC profile is a function that defines a time-varying frequency, and the duration of the period of the SSC profile is delineated by times when the time-varying frequency is equal to the nominal frequency.

9. A spread spectrum clock (SSC) detector comprising:

an SSC recovery circuit for obtaining a spread spectrum clock signal and comparing the spread spectrum clock signal to a reference clock signal to determine a variation between the spread spectrum clock signal and the reference clock signal, the variation defining a modified SSC profile; and an SSC profile decoder in communication with the SSC recovery circuit, for identifying the modified SSC profile corresponding to the determined variation, identifying a unique ancillary data symbol corresponding to the modified SSC profile, and outputting the ancillary data symbol, wherein the SSC recovery circuit is connected to a receiver for receiving the spread spectrum clock signal, and the receiver is connected to a deserializer for demodulating a message from the spread spectrum clock signal.

10. The SSC detector of claim 9, wherein the modified SSC profile comprises a modified peak-to-peak amplitude of an SSC profile.

11. The SSC detector of claim 9, wherein the modified SSC profile comprises a modified duration of a period of an SSC profile.

12. The SSC detector of claim 9, wherein the SSC profile decoder comprises a processor connected to a peak detector and a comparator, the processor for identifying the modified SSC profile, identifying the unique ancillary data symbol, and outputting the ancillary data symbol.

13. The SSC detector of claim 12, wherein the processor receives a pilot symbol and corrects an offset in the modified SSC profile according to the pilot symbol.

14. The SSC detector of claim 12, wherein the processor calculates a difference between the magnitude of the maximum peak and the magnitude of the minimum peak of the modified SSC profile, and corrects an offset in the modified SSC profile according to the calculated difference.

15. The SSC detector of claim 12, wherein the processor calculates an average magnitude of the modified SSC profile, and corrects an offset in the modified SSC profile according to the calculated average magnitude.

* * * * *